United States Patent [19]

Messina

[11] 4,435,913
[45] Mar. 13, 1984

[54] DECOY

[76] Inventor: Samuel E. Messina, 2 Snowden Ave., Delmar, N.Y. 12054

[21] Appl. No.: 496,008

[22] Filed: May 19, 1983

[51] Int. Cl.³ .......................... A01M 31/06
[52] U.S. Cl. .......................... 43/3
[58] Field of Search .......................... 43/3, 2

[56] References Cited

U.S. PATENT DOCUMENTS

| 229,177 | 11/1973 | Schwartztrauber | 43/3 |
|---|---|---|---|
| 282,851 | 8/1883 | Danz | 43/3 |
| 311,877 | 2/1885 | Danz | 43/3 |
| 364,573 | 6/1887 | Brinkop | 43/3 |
| 843,588 | 2/1907 | Ditto | 43/3 |
| 977,787 | 12/1910 | Davis | 43/3 |
| 1,316,566 | 9/1919 | Fauble | 43/3 |
| 1,392,065 | 9/1921 | Klock | 43/3 |
| 1,527,711 | 2/1925 | Stallman | 43/3 |
| 1,571,213 | 10/1925 | Pitts | 43/3 |
| 1,608,045 | 11/1926 | Stallman | 43/3 |
| 1,813,370 | 7/1931 | Villatore et al. | 43/3 |
| 2,011,480 | 8/1935 | Gazalski et al. | 43/3 |
| 2,237,194 | 4/1941 | Ohnmacht | 43/3 |
| 2,267,357 | 12/1941 | Soule | 43/3 |
| 2,274,246 | 2/1942 | Riddell | 43/3 |
| 2,430,645 | 11/1947 | Mills et al. | 43/3 |
| 2,441,753 | 5/1948 | Carpenter | 43/3 |
| 2,483,680 | 10/1949 | Timm et al. | 43/3 |
| 2,535,445 | 12/1950 | Miller et al. | 43/3 |
| 2,723,480 | 11/1955 | Candy | 43/3 |
| 2,746,196 | 5/1956 | Karr | 43/3 |
| 2,763,952 | 9/1956 | Bruce | 43/3 |
| 2,787,074 | 4/1957 | Miller | 43/3 |
| 2,947,104 | 8/1960 | Johnson et al. | 43/3 |
| 3,029,541 | 4/1962 | Palmer | 43/3 |
| 3,350,808 | 11/1967 | Mitchell | 43/3 |
| 3,704,538 | 12/1972 | Gagnon | 43/3 |
| 4,062,141 | 12/1977 | Shjeflo | 43/3 |
| 4,251,937 | 2/1981 | Curley | 43/3 |
| 4,334,643 | 6/1982 | Farmer | 43/3 |

Primary Examiner—Gene P. Crosby
Attorney, Agent, or Firm—Walter F. Wessendorf, Jr.

[57] ABSTRACT

Defined is a buoyant, full-bodied decoy for land or water use having top and bottom shells of brown-moulded plastic joined together by an interfitting joint, and maintained so joined together by a shaft component of a shaft-stake keel member. The shaft carries an articulating head. The stake is pivotable relative to the shaft. In land use, the stake is imbedded vertically in the ground for a standing or sentinel position, and at an angle for a feeding position; in water use, the stake is retracted to its swimming position. The stake keel constitutes a counterbalancing weight below the water line to maintain the decoy stable.

20 Claims, 2 Drawing Figures

DECOY

BACKGROUND OF THE INVENTION

1. Technical Field

The invention relates to a waterfowl decoy for use on land or water to attract ducks, geese, etc. to such decoy and induce them to land.

2. Background Art

The problem in the prior art is the need for a decoy for ducks, geese, etc. made of three members that can be removably assembled easily and quickly for use on land or water.

Accordingly, the object of this invention is to contribute to the solution of the discussed problem of the prior art by providing a decoy for ducks, geese, etc. made of three easily portable manners that can be removably assembled easily and quickly for use on land or water.

SUMMARY OF THE INVENTION

In accordance with the invention, there is provided a decoy for ducks, geese, etc. that can be used on land or water. The decoy comprises top and bottom shells, forming a full bodied decoy and made of suitable blown plastic. The top shells by themselves, as well as the bottom shells by themselves, can be stacked together for easy portability and storage. A top shell and a bottom shell are removably assembled together in waterproof relationship by means of their interference fitting groove and tongue joint and a threaded shaft component of a shaft-stake keel. Such threaded shaft is engaged with a threaded boss in the bottom shell. The stake keel component is articulatable so that the decoy can be disposed in a swimming position or in a feeding position or in a standing or sentinel position. Such structure of this decoy has the following functional attributes, to wit:

a. Ease of assembly in the field.

b. Economical to manufacture.

c. Economical and versatile since a differently painted top shell and head provides the hunter with a decoy for a different species.

d. Precisely the same decoy can be used on land or in the water.

e. More life-like in the field.

f. More life-like in the water.

g. Floats more naturally.

h. Dynamics permits facing the decoy in any direction when used on the land, not just into the wind, thus providing a natural set of decoys.

i. The blown-moulded plastic shells for both the top and bottom shells, individually contoured for stacking, permit a hunter to carry more full bodied decoys to land and water hunting locations.

j. Such blown plastic is durable, and is not subject to damage from shot pellets and normal wear and tear, as are rubber and vinyl decoys.

k. Does not require inflation like rubber and vinyl inflatable decoys.

l. The blown plastic decoy is light in weight, aiding portability.

m. Blown plastic decoys are relatively inexpensive to manufacture with the result it can be sold at a lower price to a hunter.

n. As part of the shaft component, the head can be rotated in a horizontal plane to provide life-like diversity and reality to the decoy.

o. As part of the shaft component, the head can be articulated by rotation in the vertical plane to resemble a feeding or sentinel decoy.

p. The head is removable, and can be replaced by other head styles resembling different species.

q. The shaft component carries the head and is in articulating relationship with the stake keel component, and the shaft component holds the top and bottom shells together in sealed relationship.

r. The stake keel component secures the decoy to the land, and provides the required stability when used in the water.

s. The entire decoy assembly is comprised of three members (i.e., the top shell, the bottom shell and the shaft-stake keel), and no additional components are necessary, such as a stake and keel as separate pieces, to convert from land to water use, or vice versa.

t. This staked decoy on land is more stable in the wind, and is less susceptible to being blown over or out of position vis-a-vis an unstaked decoy.

u. This staked decoy on land is elevated above the ground and looks more natural than a decoy which sits on the ground, particularly to geese or ducks approaching low from the horizon.

v. The weight of the shaft-stake keel below the water line counterbalances the above water line weight of the decoy so that the decoy floats naturally and remains stable in the water and will not roll, pitch or rock by itself except from wave action of the water, thereby minimizing turnovers from wind or wave action.

BRIEF DESCRIPTION OF THE DRAWINGS

This object and other objects of the invention should be discerned and appreciated by reference to the drawings, wherein like reference numerals refer to similar parts throughout the several views, in which.

DESCRIPTION OF THE PREFERRED EMBODIMENT

Figure 1:
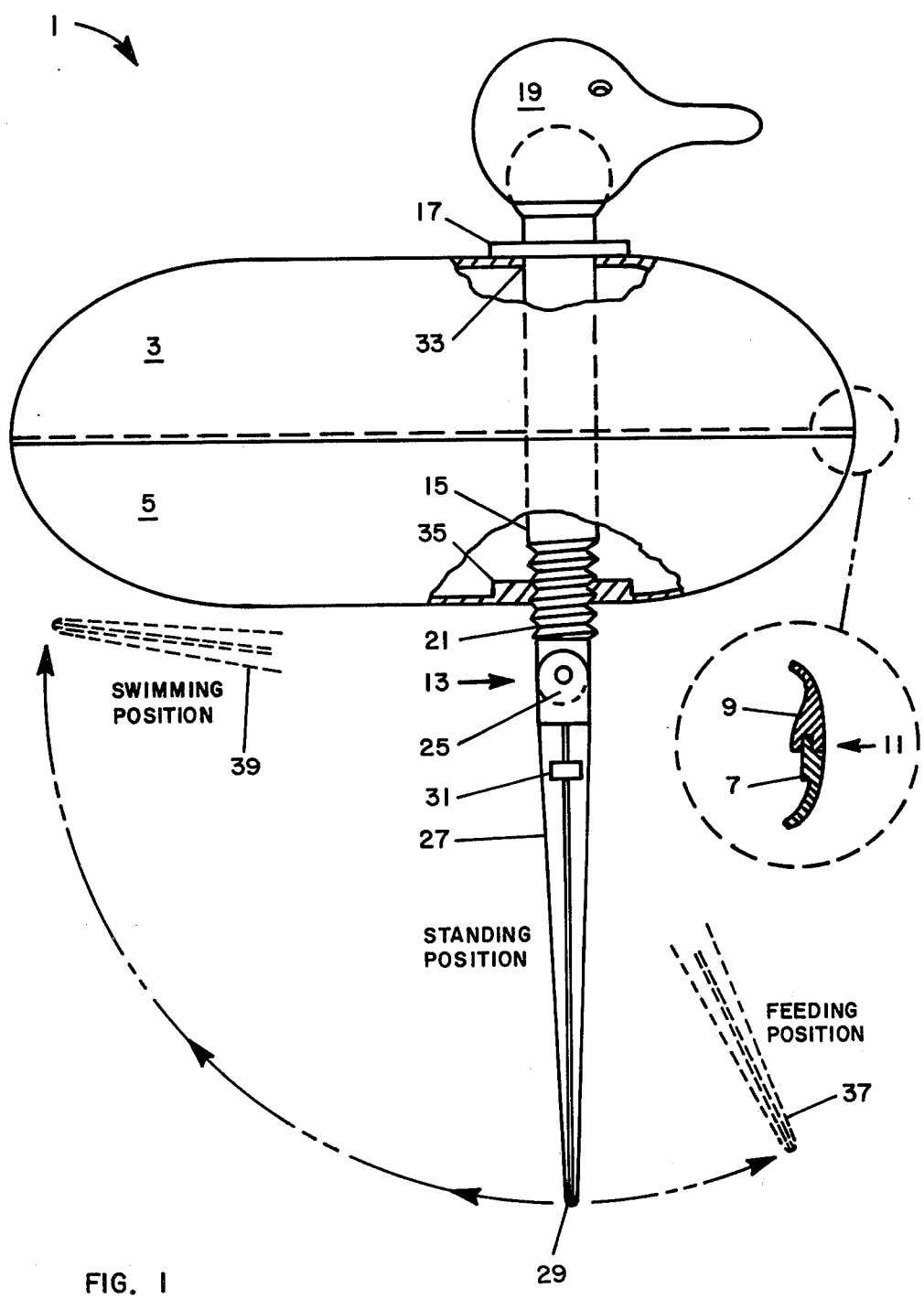
FIG. 1 is a side elevational view of the decoy, partly in section.
Figure 2:
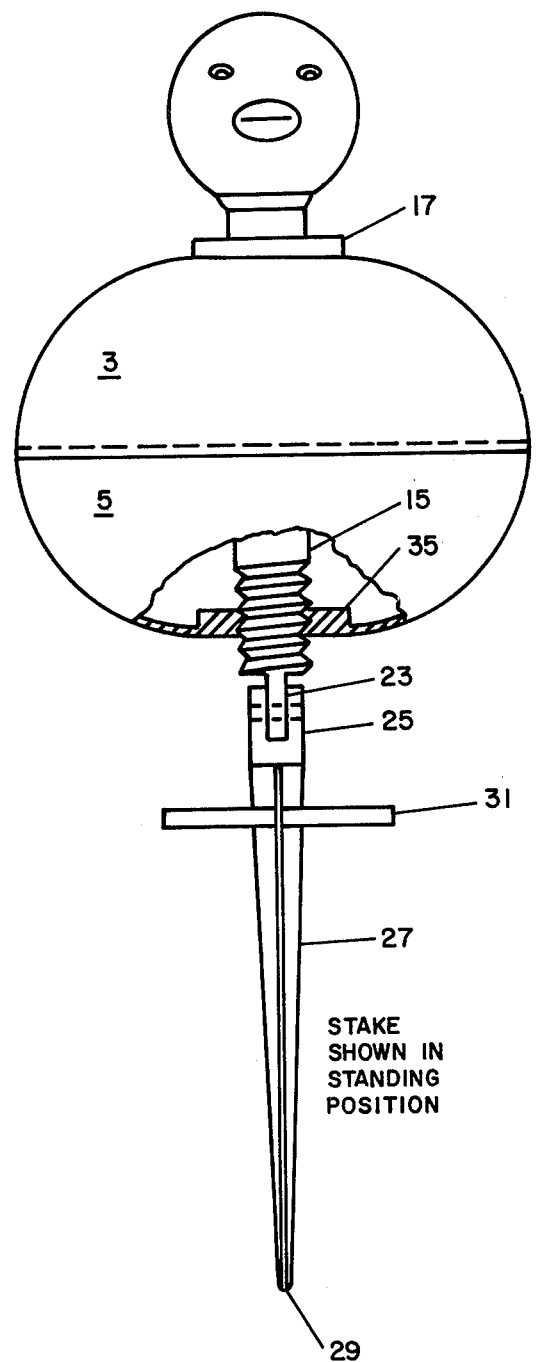
FIG. 2 is a front elevational view of the decoy, partly in section.

In FIG. 1 of the drawings, reference numeral 1 generally refers to the decoy invention.

Decoy 1 has a top half shell 3 and a bottom half shell 5, both of which are made of blown-moulded plastic or other suitable material. The bottom half shell 5 has a male tongue 7 in interference fit with a female groove 9 in the top half shell 3, thereby defining a tongue-and-groove joint 11.

The shaft-stake keel member 13 comprises a shaft 15 which fixedly carries at its upper portion a compression flange 17, and which has at its upper end a removable head 19 in ball-and-socket mounting relationship. The lower portion of shaft 15 is tapered and threaded as indicated by reference numeral 21 applied thereto. The lower end of shaft 15 has a tongue 23 in interference fit with ears 25 upstanding from the proximal end of stake 27. Tongue 23 is in pivotal, trunnion-mounting relationship with ears 25. Stake 27 is tapered and terminates distally in a blunt point 29. The proximal portion of stake 27 has integral therewith a crosspiece 31 in traverse relationship.

The uppermost portion of the top half shell 3 has a hole 33 therethrough complemental with shaft 15 and the lowermost portion of the bottom shell 5 has integral therewith a threaded boss 35.

In assembly, the top and bottom shells 3 and 5 are disposed in appropriate interfitting relationship such that male tongue 7 is received in female groove 9. Then the shaft-stake keel member 13 is appropriately disposed in top shell 3 such that shaft 15 is disposed through hole 33 and the threaded portion 21 of shaft 15 is sufficiently engaged in tightening relationship such that compression flange 17 sealingly engages and covers hole 33 and similarly renders tongue-and-groove joint 11 in waterproof relationship.

In operation of the decoy on land, the human operator appropriately grasps in manipulative relationship crosspiece 31 and imbeds stake 27 distally in the ground. FIG. 1 shows the head 19 and stake 27 in the sentinel or standing position. After imbedment of the stake 27 in the ground, the feeding position, as indicated by applied reference numeral 37, may be effected by appropriate angular disposition of stake 27 relative to shaft 15, along with rotative articulation downwardly of head 19 relative to shaft 15.

In operation of the decoy on water, stake 27 is disposed in its swimming position, as indicated by applied reference numeral 39, so that the decoy can float on water. To secure the decoy, a mooring line can be tied to an independent stake concealed beneath the water and the other end of such mooring line can be tied to the crosspiece 31 of stake 27.

Having thusly described my invention, I claim:

1. A full-bodied decoy for use on land or water, said decoy comprising a top shell, a bottom shell and a shaft-stake keel member; said top and bottom shells having interfitting joint means to join together said top and bottom shells to afford buoyancy for water use of said decoy, said shaft-stake keel member having a shaft, said shaft carrying a head, said shaft being disposed through said top and bottom shells, said shaft, top shell and bottom shell having cooperating securement means for securing said shaft with said top and bottom shells, and for maintaining said top and bottom shells joined together, said stake keel being imbedded in the ground for land use of said decoy, and said stake keel having a counterbalancing weight below the water line of said decoy to maintain said decoy stable in the water.

2. A decoy in accordance with claim 1, wherein said interfitting joint comprises a male tongue in one of said shells engaged in a female froove in the other of said shells.

3. A decoy in accordance with claim 1, wherein said head is carried on said shaft in ball-and-socket relationship.

4. A decoy in accordance with claim 1, wherein said shaft and stake keel have cooperating means affording pivotal, trunnion-mounting relationship therebetween.

5. A decoy in accordance with claim 1, wherein said stake keel has a crosspiece to facilitate manipulative grasping of same for ground imbedment of said stake keel.

6. A decoy in accordance with claim 1, wherein said shells are of suitable blown-moulded plastic.

7. A decoy in accordance with claim 1, wherein said shaft has a flange and threaded portion, wherein one of said shells has a threaded boss, and wherein said flange sealingly engages one of said shells and said threaded portion of said shaft engages said threaded boss in tightened relationship to define said cooperating means for securing said shaft with said top and bottom shells, and to maintain said top and bottom shells joined together.

8. A decoy in accordance with claim 2, wherein said head is carried on said shaft in ball-and-socket relationship.

9. A decoy in accordance with claim 2, wherein said shaft and stake keel have cooperating means affording pivotal, trunnion-mounting relationship therebetween.

10. A decoy in accordance with claim 2, wherein said stake keel has a crosspiece to facilitate manipulative grasping of same for ground imbedment of said stake keel.

11. A decoy in accordance with claim 2, wherein said shells are of suitable blown-moulded plastic.

12. A decoy in accordance with claim 8, wherein said shaft and stake keel have cooperating means affording pivotal, trunnion-mounting relationship therebetween.

13. A decoy in accordance with claim 8, wherein said stake keel has a crosspiece to facilitate manipulative grasping of same for ground imbedment of said stake keel.

14. A decoy in accordance with claim 8, wherein said shells are of suitable blown-moulded plastic.

15. A decoy in accordance with claim 9, wherein said stake keel has a crosspiece to facilitate manipulative grasping of same for ground imbediment of said stake keel.

16. A decoy in accordance with claim 7, wherein said interfitting joint comprises a male tongue in one of said shells engaged in a female groove in the other of said shells.

17. A decoy in accordance with claim 7, wherein said head is carried on said shaft in ball-and-socket relationship.

18. A decoy in accordance with claim 7, wherein said shaft and stake keel have cooperating means affording pivotal, trunnion-mounting relationship therebetween.

19. A decoy in accordance with claim 7, wherein said stake keel has a crosspiece to facilitate manipulative grasping of same for ground imbedment of said stake keel.

20. A decoy in accordance with claim 7, wherein said shells are of suitable blown-moulded plastic.

* * * * *